United States Patent [19]

Tharp et al.

[11] Patent Number: 4,649,662

[45] Date of Patent: Mar. 17, 1987

[54] CURVED FISHING POST

[76] Inventors: Perry A. Tharp, 1005 Jackson Ave.; S. Wayne Tharp, 1300 Center Rd., both of, Monaca, Pa. 15061

[21] Appl. No.: 833,374

[22] Filed: Feb. 25, 1986

[51] Int. Cl.$^4$ ............................................. A01K 95/00
[52] U.S. Cl. ................................. 43/43.14; 43/44.97
[58] Field of Search ............... 43/43.1, 42.31, 42.4, 43/43.14, 44.96, 44.97, 15

[56] References Cited

U.S. PATENT DOCUMENTS

| | | | |
|---|---|---|---|
| 2,157,003 | 5/1939 | Mussina | 43/43.14 |
| 2,605,576 | 8/1952 | Young | 43/43.14 |
| 2,985,981 | 5/1961 | King | 43/43.14 |
| 3,084,471 | 4/1963 | Alspaugh | 43/43.14 |
| 3,183,620 | 5/1965 | Dockal | 43/43.14 |
| 3,184,879 | 5/1965 | Ruhl | 43/43.14 |
| 3,670,447 | 6/1972 | Wohead | 43/43.14 |
| 3,698,120 | 10/1972 | Grogan | 43/43.14 |
| 3,785,078 | 1/1974 | Seitz | 43/43.14 |
| 3,820,270 | 6/1974 | LaForce | 43/43.14 |
| 3,852,906 | 12/1974 | LaForce | 43/43.14 |

Primary Examiner—M. Jordan
Attorney, Agent, or Firm—Harry D. Anspon

[57] ABSTRACT

Elongated rod or tubing in the shape of an arc of a circle with a buoyant in-water upper portion of the arc and with a non-buoyant in-water lower portion of the arc with a means of line attachment at the end of the buoyant upper portion of the arc, having whole of arc of sufficient weight in relation to its volume of displacement of water as to sink in water is useful as a fishing-post at the bottom of a body of water for attachment of a fishing line and hooks.

22 Claims, 11 Drawing Figures

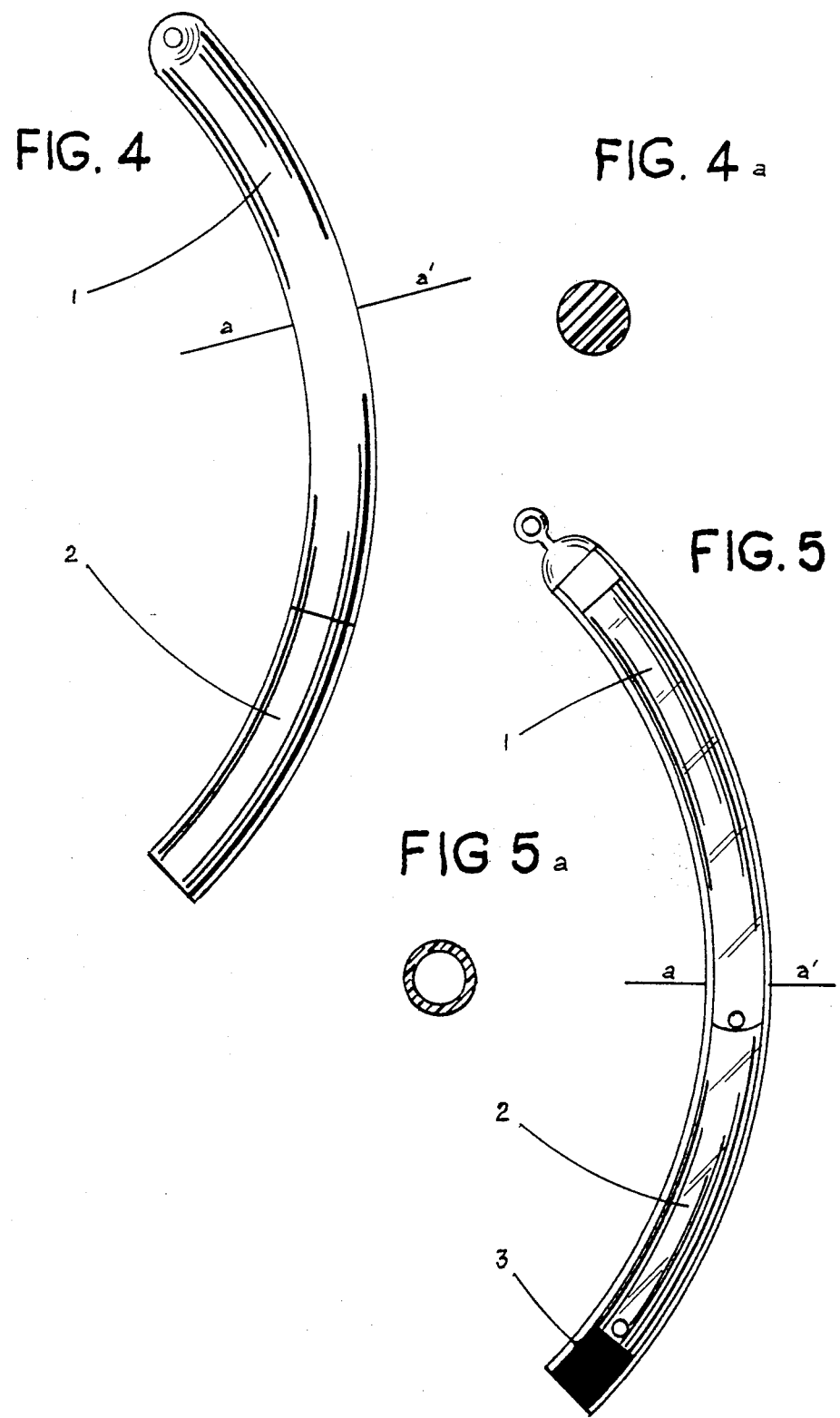

CURVED FISHING POST

BACKGROUND OF THE INVENTION

1. Field of the Invention

This invention is a device for fishing, comprising a fishing line attachment which may have adjustable weight or buoyancy. This attachment is a fishing post. The term "fishing-post" is used to denote an elongated rod or tubing which maintains itself in a generally upright position in water and whose line attachment means at the top of the upright rod or tubing is maintained at a set distance from the bottom of the rod or tubing which is weighted to be in contact with the bottom of a body of water.

This invention pertains to a curved fishing-post line support possessing a curved elongated form made of rod or tubing. This rod or tubing is constructed so that its upper portion to which the fishing line is attached is buoyant in water, while its lower portion is non-buoyant in water. The lower portion of the rod or tubing is of sufficient density to normally maintain the lower part of the elongated form in contact with the bottom of a body of water, while the buoyant upper portion maintains the rod or tubing in an upright position so that the line attachment means at the end of the upper portion is a fixed distance from the bottom of a body of water.

This invention is specifically related to a curved fishing-post where the elongated rod or tubing is in the form of an arc of a circle. The arc of the circle generally subtends an angle of 90° or less. The arc of the circle may subtend an angle of around 45°, although arcs subtending angles greater or less than 45° can be used. This curved fishing-post maintains the line attached to its buoyant end at a fixed Position from the curved non-buoyant weighted end with the curved fishing-post being in a generally upright position, while its weighted end is in contact with the bottom of a body of water. Thus the line attachment means of the curved fishing-post is maintained at a set distance from the bottom of a body of water being fished.

The fish hooks attached to the line are usually appended on various leaders attached to the line just ahead of the attachment to the curved fishing post. The fishhooks, however, may be attached to a lure on a line attached to the top of the fishing-post, which in turn is attached to the line. In this manner the fishing hooks of the lure are held a set distance from the bottom. These lures may be diving lures. In some instances the fishing hooks may be attached by short leaders to the curved fishing-post. The hooks on leaders are generally baited, although they can be fitted with artificial lures such as plugs or flies and action devices such as spinners.

2. Description of the Prior Art

Devices which function in a manner similar to a fishing-post have been described in prior art, although not identified as fishing-posts.

In U.S. Pat. No. 2,157,003 Mussina described an apparatus to support a hook at any desired distance from the bottom comprising a rod connected to a fishing line and having a weight at its other end, a float slidably mounted on the rod, with the hook connected to the float and a stop on the rod to limit the upward movement of the float on the rod. While this device performs as a fishing-post, it does not exhibit the special characteristics of a curved fishing-post of this invention.

In U.S. Pat. No. 2,605,576, Young et al. described a fishing line sinker having a buoyant portion and a non-buoyant portion of elongated cylindrical shape which remains upright in the water at the bottom. This sinker is described as rising rapidly on retrieval and possessing anti-fouling properties. This sinker was described as optionally having fins to facilitate rising action on retrieval. The vanes are described as being at regular intervals of 90°. The drawings and description show straight sided cylinders, including ones with fins. The effects of the curved fishing-post of the present invention are not achieved with this device, especially if the line extends any distance out from the fisherman to the fishing-post sinker.

In U.S. Pat. No. 2,985,981 King describes a non-fouling sinker which tends to assume an upright position in the water. This sinker comprises a head for connection to a fishing lure, an elongated flexible sack of circular form, and a weight with liquid and an air chamber enclosed by the flexible sack secured to the head. This sinker is cited for its anti-snag properties. There is no indication that the sinker of King has any of the features of the curved fishing-post of this invention.

In U.S. Pat. No. 3,084,471 Alspaugh describes a floating anti-fouling sinker and chum dispenser. The perforated walls of his device admit: water and allow chum to escape. An air chamber in the upper tubular body maintains the elongated tubular body in an upright position, while a weight in the lower part of the body causes it to be upright in water and determines how far it will sink. The drawings and description indicate straight tubular bodies with none of the special characteristics of a curved fishing-post.

In U.S. Pat. No. 3,183,620 Dockal provides an upright in water tubular device with leaders to hooks and having holes covered by annular sleeves which can be moved to trap varying amounts of air and vary the buoyancy of the device in water. The device in the drawing and description is straight and does not have the curved feature of the fishing-post of this invention.

In U.S. Pat. No. 3,670,447, Wohead describes a sinker for fishing characterized by an elongated tubular body having a flotation portion adjacent to one end and weight concentrated adjacent to the other end, so that it assumes a substantially upright position in the water. The tubing employed is described as flexible so that it will bend to aid retrieval from a crevice. The drawings indicate straight tubing, and the description indicates tubing flexibility. No retention of a curved shape is shown so that the device would not perform as a curved fishing-post of this invention.

In U.S. Pat. No. 3,184,879 Ruhl describes a large buoyant hollow body with leaders and hooks attached to the hollow body. The drawings and description disclose only straight tubes, and none of the special effects of a curved fishing-post are shown.

In U.S. Pat. No. 3,698,120 Grogan describes a float sinker which is adapted to hold the baited hook up and out of bottom vegetation. The drawings and description do not otherwise indicate that the buoyant sinker shows any of the special effects of a curved fishing-post.

In U.S. Pat. No. 3,785,078 Seitz describes a sinker with a pointed and tapered nose which was composed of different density materials which functioned to maintain the sinker with its pointed nose up-stream. This sinker was straight and did not function in the manner of a curved fishing-post of this invention.

In U.S. Pat. No. 3,820,270 LaForce describes a semi-buoyant sinker which will assume an upright position near the bottom to hold the line off the bottom. The sinkers of his drawings and description do not show the important curved outline of the curved fishing-posts of this invention.

In U.S. Pat. No. 3,852,906 LaForce describes a fishing-sinker having buoyancy and of an elongated cylindrical body which can have connections for a fishing line aligned along the cylindrical body. The variation of attachment points is employed to obtain different rates of sinker ascent when the line is retrieved. All of the drawings and description show straight sided cylinders. The advantageous action of a curved fishing-post is not indicated.

SUMMARY OF THE INVENTION

As detailed in the background of the invention, fishing-posts are described in prior art (under other names), but such fishing posts were constructed with straight rods or tubes. This invention describes fishing-posts curved in the general form of an arc of a circle. This curvature imparts desirable characteristics to the behavior of a fishing-post. The curved fishing-post rises rapidly from the bottom when the line is sharply pulled by a fisherman in contrast to the behavior of a straight fishing-post.

The curve of the fishing-post causes the fishing-post to move in an arc in continuation of its own circular arc. The resistance of the water favors movement of the fishing-post along the smallest cross-section, resulting in an immediate lifting of the fishing-post from the bottom of the body of water being fished. Depending on the weights at the weighted end of the fishing-post, it can be made to jump 1 to 2 feet from the bottom by a sharp pull. Release of the pull allows the weighted end to drop back with very little lateral movement of the fishing-post along the bottom of the body of water being fished.

This effect is remarkable in allowing a fisherman to effectively jig his baited hooks in the vicinity of the bottom, even when his line extends a considerable distance from his own location.

In addition to the ability to cause bait to jig near the bottom, the curved fishing-post maintains itself in an upright position when being slowly trolled and thereby does not cause line twisting. This behavior is in contrast to the line twisting which occurs when a straight fishing-post is slowly trolled.

In addition to the behavior of the curved fishing-post in trolling, it also shows resistance to line twisting which occurs when surf-fishing due to the rolling of plain sinkers by wave action.

The action of the curved fishing-post in its ability to be jumped vertically from the bottom by a sharp pull on the line is very effective in rendering the fishing-post resistant to snags.

The straight fishing-post is upright in the water and does not easily become snagged. However, the curved version is even more snag resistant because it can be jumped vertically. The vertical movement, combined with the slim shape of the curved fishing-post, is very effective in avoiding snags and in jumping out of incipient snags.

BRIEF DESCRIPTION OF THE DRAWINGS

Rigging and use of the curved fishing-post are illustrated in the following drawings, along with designs of curved fishing-posts.

FIG. 4 is a side view of one type of curved fishing-post. FIG. 4a is a cross-section at a—a' of FIG. 4. The curved fishing-post of FIG. 4 is made of a rod of buoyant material at 1, such as a solid plastic, foamed plastic or wood, with a density of less than 1.0, having a weight of high density material at its end 2, which contacts the bottom.

FIG. 5 is a side view of a curved fishing-post made from transparent material in a tubular form bent in the shape of the arc of a circle. FIG. 5a is a cross-section at a—a' of FIG. 5. In the drawing of FIG. 5 the materials of the tube may be of lower or higher density than 1.0 as long as the trapped air causes the upper portion at 1 to be buoyant (the weight of tubing and air in this portion is less than the weight of the displaced water). At the lower end of the tube water is allowed to enter to yield a non-buoyant portion at 2 in this lower arc portion (the weight of tubing and water is greater than the weight of the displaced water). With tubing materials of density greater than 1.0, no extra weight other than water is required, however, with tubing materials of density less than 1.0, an extra dense material must be added to cause the non-buoyant weighted end to contact the bottom. Such dense material is shown as 3 on FIG. 5.

DESCRIPTION OF THE PREFERRED EMBODIMENTS

Figure 1:
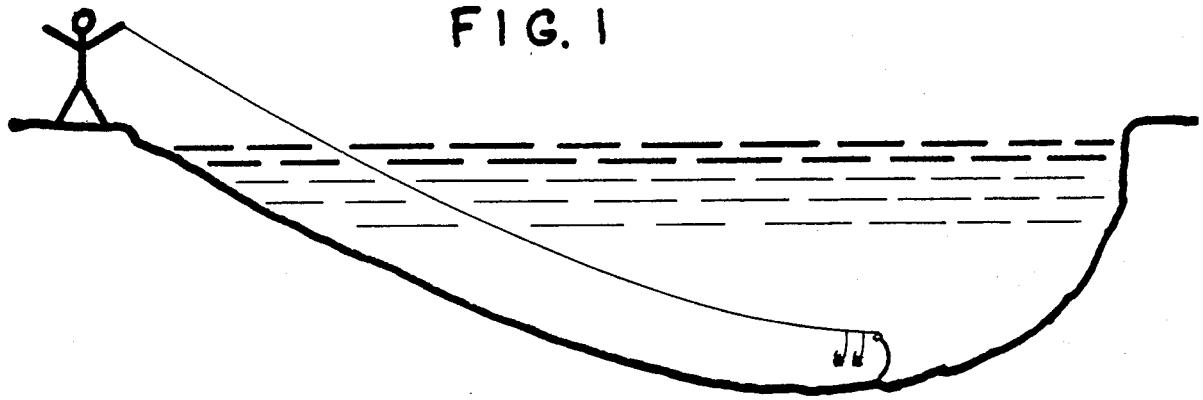
FIG. 1 is a side view of a curved fishing-post of the present invention rigged to the end of a fishing line with the fishing-post in an upright position from the bottom of the body of water being fished. Baited hooks are shown attached to the line just forward of the curved fishing-post. The use of the fishing-post to maintain the end of the line and the baited hooks at a set distance from the bottom is shown.
Figure 2:
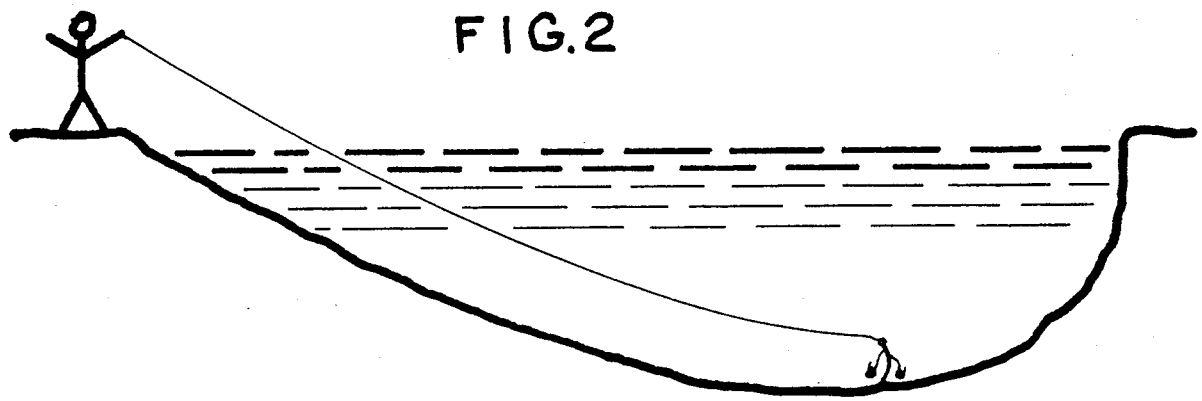
FIG. 2 is a side view of a curved fishing-post of the present invention rigged to the end of a fishing line with the fishing-post in an upright position from the bottom of the body of water being fished. In this drawing, baited hooks are attached to the fishing post by short leaders positioned at different elevations of the upright curved fishing post. The hooks thereby are maintained at different distances to the bottom of the body of water being fished.
Figure 3:
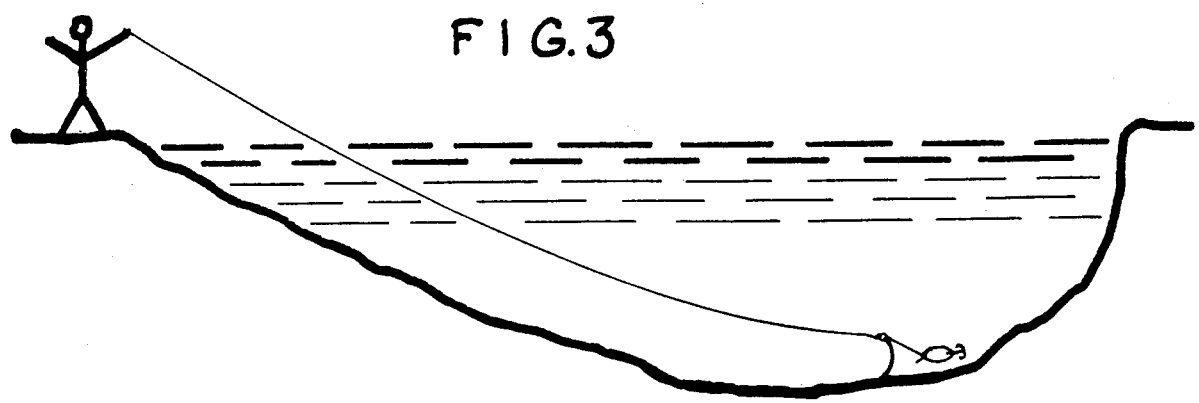
FIG. 3 is a side view of a curved fishing-post of the present invention rigged to the end of a fishing line with the fishing-post in an upright position from the bottom of the body of water being fished. In this drawing a lure with hooks is attached to the line following the curved fishing-post. Such a lure may be one of the diving types. A baited hook may be used in place of the lure, in which case the fishing-post and the length of leader from the baited hook to the top of the fishing-post set t the distance from the baited hook to the bottom of the body of water being fished.
Figure 6:
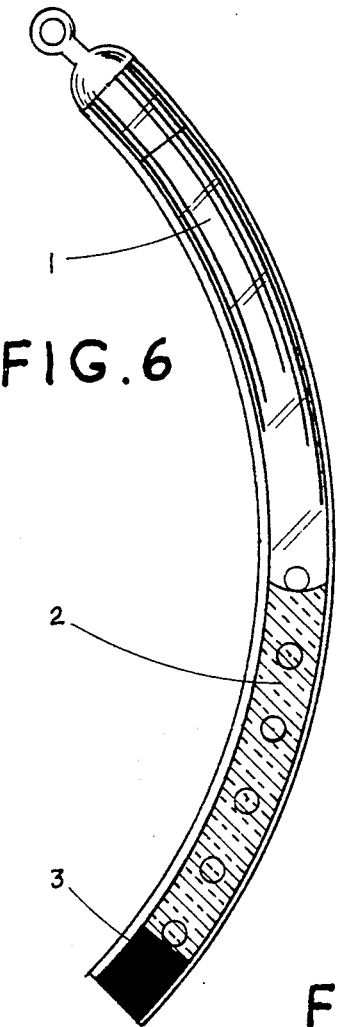
FIG. 6 is a side view of a curved fishing-post made from material in a tubular form bent in the shape of the arc of a circle. In this fishing-post, the tubular material at 1 may be of density less or greater than 1.0. The bottom portion of the tubing is perforated with holes to permit textile wadding or open cell plastic foam saturated with a scent to be placed inside the tubing at 2. The bottom of the tubing may be left open or closed with a weight at 3 as long as the bottom portion of the tubing is of sufficient weight to cause the whole tubing to sink and to contact the bottom.
Figure 7:
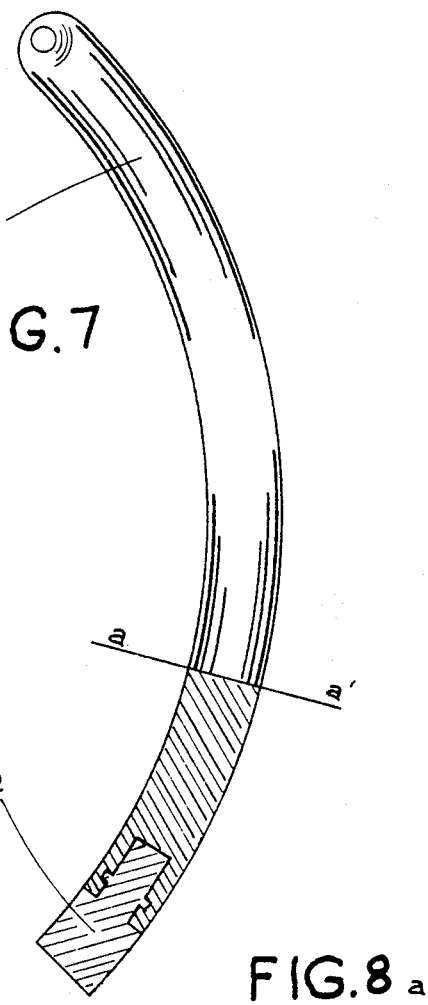
FIG. 7 shows a curved fishing-post made of a rod of plastic material at 1 whose density is less than 1.0. At the bottom of this plastic material there is a circular recess containing an inside annular groove, shown in half-section starting at a—a' of FIG. 7. Weights of dense materials at 2 of FIG. 7 in the form of the recess and containing a corresponding annular ring to fit the groove of the circular recess may be pressed into the recess to cause the curved fishing-post with weight to contact the bottom. As shown in half-section from a—a' down, different weights, each containing the annular ring on the cylindrical end piece, can be employed to increase the weight of the curved fishing-post and to cause the fishing-post to increase its resistance to movement. This type of variable weight attachment at 2 of FIG. 7 may also be employed with the designs of FIGS. 4, 5 and 6.
Figure 8:
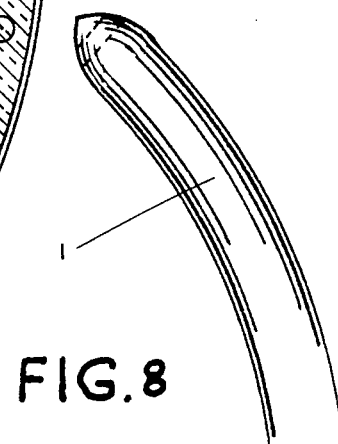
FIG. 8 shows a curved fishing-post made of plastic material at 1 whose density is less than 1.0.
Figure 8A:
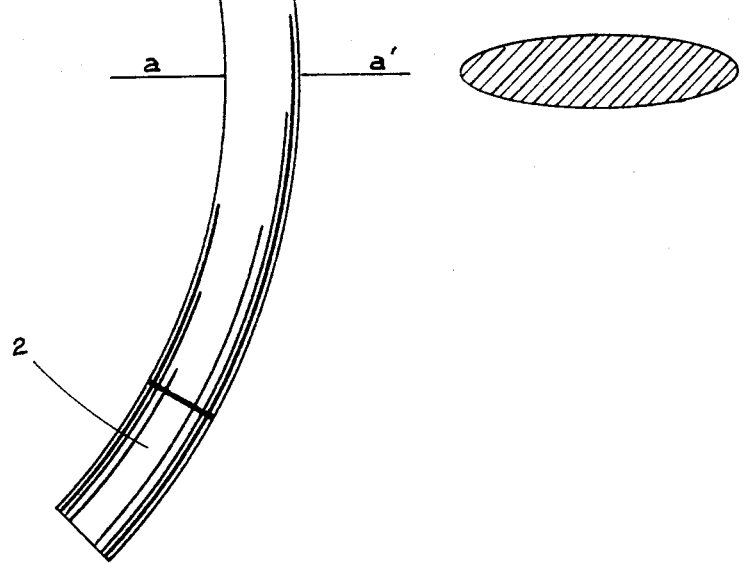
In FIG. 8a is shown a cross-section at a—a' of FIG. 8. In the curved fishing-post of FIG. 8 the curved surface of the fishing-post along the inside and outside of the arc has been increased with a reduction of the surface at the edges in the plane of the arc. This design of the cross-section of the fishing-post increases the lift imparted to the curved fishing-post by a pull on the line by a fisherman. A dense material is attached at 2 of FIG. 8 to cause the fishing post to sink in water.

The curved fishing-posts shown in FIGS. 4, 5, 6, 7 and 8 have their critical feature in their curvature along an arc of a circle. All of the fishing-posts depicted are suitable and useable designs. The performance features of these curved fishing-posts and their utility arising from their curvature are described below, with ranges of dimensions which may be of greatest utility, materials of construction, and performance effects relating to the length of the arc employed and the angle subtended by that arc.

The curved fishing-post is useful in fishing fresh water streams, lakes and rivers, as well as salt water bays, oceans and ocean surfs. Its greatest utility likely is found in fishing for bottom feeding fish where the feature of positioning baited hooks at selected distances from the bottom is important. This feature, coupled with the ability to jig the bait even when the line is extended from the fisherman, is effective and useful in fishing for bottom feeding fish.

A curved fishing-post resists twisting of the line to which it is attached. The line non-twisting feature of a curved fishing-post also is useful in trolling and in surf fishing. Trolling speeds obviously should be low so that this feature of a curved fishing-post can be maintained.

The curved fishing-post exhibits another attribute in that trolling speeds can be slow, and the fishing-post will rise in the water through various water layers to eventually reach the surface. This attribute is important in fishing for Bluefish. Schools of Bluefish at different times feed at various depths, and having a device that can cause the baited hooks or lures with hooks to rise through the water at slow trolling speeds can locate these fish schools. Further, after finding the schools, the trolling speed is slow enough so that one can maneuver a boat to stay in the vicinity of a school, rather than passing through a school and having large sweeping turns to perform to return to the school when trolling at moderate speeds needed to cause straight fishing-posts to rise.

In lake fishing, fish are likely to feed at certain water temperature levels. The curved fishing-post can be used to raise baited hooks or lures with hooks through the various water levels above the bottom of the lake by slow retrieval or slow trolling.

The curved fishing-post can be used advantageously with diving lures when the curved fishing-post is located on the end of the fishing line and the diving lure is attached to the lure beyond the curved fishing-post. Within this set-up, a pull on the line will cause the curved fishing-post to rise, while the movement of the rising fishing-post will cause the diving lure to dive.

In this manner a diving lure can be handled without the lure striking the bottom during its diving and darting action while fishing in the vicinity of the bottom.

The curved fishing-post with a perforated section for holding textile wadding or open cell plastic foam containing scents can be effectively employed in causing the scent to pass through various levels of water in seeking a level containing feeding fish.

The curved fishing-post of this invention is an elongated rod or tubular material formed in the shape of an arc of a circle which maintains itself at the bottom of a body of water in an upright position. The rod or tubing in the form of the arc of a circle has a portion of the arc which is weighted sufficiently to cause the lower part of the arc to rest on the bottom of a body of water. The buoyant part of the arc causes the whole arc form to remain upright.

While the curved fishing-post may be varied greatly to fall within this description and to have utility in fishing in different types of bodies of water, a form useful for many types of fishing is a tubing or rod which is an 8-inch long arc of a circle of 36" circumference. The outside diameter of the rod or tubing is ½ inch. The tubing of ½ inch O.D. is of ⅜ inch I.D. The top buoyant end is sealed and is fitted with an eye type attachment. The eye may be mounted on a swivel. The bottom of the tubing is closed with a lead weight of ½ oz. which is rod shaped and is press fitted to seal the lower end of the arc of tubing. The tubing with all its components weighs 1 oz. The tubing employed is a transparent semi-rigid, partially flexible plasticized polyvinyl chloride resin. Directly above the top of the weight is a 1/16 inch diameter hole which allows water to enter the tubing up to 3 inches from the bottom of the weight where a 1/16" diameter air vent hole is located. When used on a fishing line, the fishing post sinks to the bottom with an air bubble being present in the upper 5 inches of the tubing. The curved fishing-post maintains itself in an upright position. When the line is sharply pulled, the fishing-post jumps from its position on the bottom.

The angle subtended by the arc of the circle employed for the curvature of the fishing-post generally is less than 90°, otherwise the top portion of the fishing-post arc tends to dive toward the bottom when the bottom rises from a line pull. The curved fishing-post can subtend an angle of 45° or less, especially when the circumference of the circle is greater than 36 inches.

While the jigging or jumping action of the curved fishing-post can be effected when the angle subtended by the arc of a circle is greater than 90°, the behavior on trolling becomes erratic as this angle is exceeded. As the angle drops below 45°, the resistance of the device to line twisting on trolling diminishes. The preferred range is from around 90° to around 45° for the angle subtended by the arc of the curved fishing-post.

The circumference of the circle whose arc is employed for the curvature of the fishing post can vary, depending on the specific fishing circumstances or conditions. It is obvious that the curvature induces the fishing-post to move up along the arc and circumference of the circle employed since the path of least resistance to movement in the water causes the minimum frontal area at the line attachment to move. Inertia favors continuation along this path once started. When large upward jumps are to be employed, a large circle will be chosen for the curvature. When small jumps are to be employed, the circle can be of a small circumference. Circles normally employed will vary from circumferences of 50 ft. to around 1 ft., with preferred circle circumferences of 12 ft. to 3 ft. The height of the fishing-post or the length of the arc of the fishing-post will have a bearing on the choice of circle circumference since long arcs favor the choice of large circumferences.

The fishing device of a curved fishing-post is formed substantially in the shape of an arc of a circle in order to have it perform as described and move along the arc of a circle on retrieval. Minor variations from the arc shape can be tolerated as long as the shape is substantially that of an arc of a circle.

The length of arc employed is seldom less than 2 inches since such a distance is so short that the line is almost on the bottom. In addition, a very short arc length, while retaining the jumping effect from a line pull, is subject to having no part which is above bottom debris and rocks, which reduces its anti-snag performance. The preferred length of the curved fishing-post is from 8 to 18 inches, measured along its arc of curvature. A useful range of curved fishing-post arc length is from 6 to 36 inches. The total weight of the curved fishing-post employed for most fishing uses ranges from ½ oz. to around 6 ozs.

While the curved fishing-post described above possesses water holes to reduce buoyancy of the tube, it is possible to employ slits for water entry. It is also possible to adjust the size of the holes or slits to control the rate at which the curved fishing-post sinks. The outside diameter of the curved fishing-post most often is in the range of ⅛ inch to 1 inch.

The curved fishing-post is most often used in the form of round rod or tubing for simplicity of construction. However, cross sections of the curved fishing post may include other forms to accentuate the tendency of the fishing-post to rise by presenting more surface normal to the inside of the curve and less surface parallel to the plane of the arc of curvature. When this profile flattening is done, the part behind the attachment eye is tapered back to present a streamlined end. The eye is usually mounted so that the material tapers back to the profile of the fishing-post.

While a round rod or tubing is a preferred form for simplicity of construction, the terms "rod" and "tubing" are to be construed as to include a wide range of profiles. Square, rectangular, triangular or oval profiles, for example, are to be included under "rod" or "tubing". While it is most often preferred to accentuate the tendency of the fishing-post to rise by presenting more surface normal to the inside of the curve and less surface parallel to the plane of the arc of curvature, it is possible that at times it may be desired to suppress the tendency to rise. This desire may occur when weights are employed in the non-buoyant portion of the arc which barely overcome the buoyancy of the buoyant portion of the arc. The tendency to rise may be suppressed by reducing the surface normal to the inside of the curve and increasing the surface parallel to the plane of the arc of curvature.

The curved fishing-post is usually made so that its surfaces are smooth. The curved fishing-posts can be made of materials such as wood, metal, glass or plastic. The metal or glass fishing-posts must have air chambers for buoyancy. The wood fishing-posts have to be steam bent, dried and painted, so that pricewise they are not commercially attractive. Plastic rod or tubing constitute the preferred materials of construction. Plastics such as low density polyethylene, high density polyethylene, polypropylene, and polybutene-1 can be employed in rod form since their densities are less than 1.0. Other plastics with densities greater than 1.0 may be converted to foam and employed as rods of foam polymer. A wide range of water insoluble plastics may be employed in tubing form or rod form.

The plastics employed may range from hard, stiff plastics such as polypropylene to soft, semi-flexible plastics such as the copolymers of ethylene. While rubbers are included in the plastics which may be used, they must be vulcanized to hold the curved shape at room temperature and possess sufficient stiffness to hold this curved form in use.

The plastics employed may be transparent or opaque. They may be a natural color, or they may be colored to any desired shade, including fluorescent colors such as fluorescent reds. They may also be made phosphorescent with special coatings.

Included in plastics which may be used are ABS (acrylnitrilebutadiene-styrene) resins, polystyrenes (crystal and impact), acetals, acrylics, Nylons, polycarbonates, polyethylene terephthalates, polybutylene terephthalates, low density polyethylenes, high density polyethylenes, ethylene copolymers, polypropylenes, polybutene-1's, 4-methylpentene-1 polymers, polyvinyl chlorides, polyurethanes, polysulfones, polyphenylene sulfides, ethylene-propylene rubbers, and polyphenylene oxides, including their blends with styrenic polymers.

The stiffness or flexural modulus of the material employed in the rod or tubing can vary widely from 500,000 psi or greater to around 10,000 psi or less. The criterion of the choice of material is that it be insoluble in water, not plasticized by water, and sufficiently stiff to hold its curvature under use conditions. Thus, a thin rod or thin wall tubing of a low flexural stiffness material may be unsuitable due to flexing in use and failure to hold a curvature, whereas a thicker rod or heavier wall tubing of the same material could be useable. The materials chosen should be serviceable under the outdoor conditions encountered in fishing. Extremely stiff, highly brittle materials should be avoided, as should low flexural modulus materials.

While the drawings illustrate several designs of a curved fishing post, the design feature which is important in this disclosure is the curvature of the fishing-post and the effect which this curvature has on its performance. It is desirable to provide curved fishing-posts with means to attach interchangeable and variable weights of lead or other dense material to use the same curved fishing-post under different fishing conditions. This means may be accomplished with the annular ring and groove design of FIG. 7, but other means of attaching dense weights may be employed, including threaded junctions, press fits and pinned junctions.

We claim:

1. A device for fishing, comprising: a curved fishing post formed substantially in the shape of an arc of a circle, said arc subtending an angle around 90° or less, having a portion of said arc will buoyant construction, having a portion of said arc with non-buoyant construction, having a line attachment means at an end of said arc adjacent said buoyant portion of said arc, the said arc with its said buoyant and said non-buoyant portions including said line attachment means being of sufficient weight in relation to its volume of displacement of water as to sink in water, and with said arcuate curvature, having said subtended angle of 90° or less, bestowing rapid rising of the fishing post when a fishing line attached to said fishing post having fish hooks attached to said line or to said fishing post is rapidly pulled in a retrieval mode.

2. The curved fishing-post of claim 1 wherein the material of construction of the arc is a rod of polyolefin.

3. The curved fishing-post of claim 1 wherein the material of construction of the arc is a rod of polypropylene or a polypropylene copolymer.

4. The curved fishing-post of claim 1 wherein the material of construction of the arc is a rod of polyethylene or an ethylene copolymer with a density less than 1.0.

5. The curved fishing-post of claim 1 wherein the material of construction of the arc is a rod of 4-methyl-pentene-1 polymer or a 4-methyl-pentene-1 copolymer.

6. The curved fishing-post of claim 1 wherein the material of construction of the arc is a rod of foamed plastic with a density less than 1.0.

7. The curved fishing-post of claim 1 wherein the material of construction of the arc is a rod of foamed polyolefin.

8. The curved fishing-post of claim 1 wherein the material of construction of the arc is a rod of foamed polypropylene or a foamed polypropylene copolymer.

9. The curved fishing-post of claim 1 wherein the material of construction of the arc is a rod of foamed polyethylene, a foamed ethylene copolymer or a mixture of foamed polyethylene and ethylene copolymer.

10. The curved fishing-post of claim 1 wherein the material of construction of the arc is a rod of foamed polystyrene, foamed styrene copolymer or foamed ABS polymer.

11. The curved fishing-post of claim 1 wherein the material of construction of the arc is a rod of foamed polyvinyl chloride, foamed polyvinyl chloride copolymer or foamed plasticized polyvinyl chloride.

12. The curved fishing-post of claim 1 wherein the material of construction of the arc is a tubing of polyolefin.

13. The curved fishing-post of claim 1 wherein the material of construction of the arc is a tubing of polypropylene or a polypropylene copolymer.

14. The curved fishing-post of claim 1 wherein the material of construction of the arc is a tubing of polyethylene or an ethylene copolymer.

15. The curved fishing-post of claim 1 wherein the material of construction of the arc is a tubing of polyvinyl chloride, polyvinyl chloride copolymer or plasticized polyvinyl chloride.

16. The curved fishing-post of claim 1 wherein the material of construction of the arc is a tubing of polystyrene, polystyrene copolymer or ABS polymer.

17. The curved fishing-post of claim 1 wherein the material of construction of the arc is a plastic tubing containing holes for admission of water to the non-buoyant portion of the arc and for escape of air.

18. The curved fishing-post of claim 1 wherein the material of construction of the arc is a plastic tubing containing holes for admission of water to the non-buoyant portion of the arc and containing a plug of textile wadding or a plug of open cell plastic foam treated with a fish-attracting scent, which plug is enclosed in a portion of the tubing with the holes for admission of water.

19. The curved fishing-post of claim 1 wherein the material of construction of the arc is a plastic foam with an elongated cross-section wherein the largest dimension of the cross-section is perpendicular to the plane of the arc of curvature.

20. The curved fishing-post of claim 1 wherein the material of construction of the arc is a partially flattended plastic tubing with its greatest cross-section dimension perpendicular to the plane containing the arc of curvature.

21. The curved fishing-post of claim 1 wherein the rod or tubing material of construction is provided with a means of attaching lead weights of various weight amounts.

22. The process of producing a device for fishing, comprising: a curved fishing post formed substantially in the shape of an arc of a circle, said arc subtending an angle around 90° or less, having a portion of said arc with buoyant construction, having a portion of said arc with non-buoyant construction, having a line attachment means at an end of said arc adjacent said buoyant portion of said arc, the said arc with its said buoyant and said non-buoyant portions including said line attachment means being of sufficient weight in relation to its volume of displacement of water as to sink in water, by the steps of heating said plastic rod or tubing which is comprised of a buoyant upper portion and a non-buoyant or weighted lower portion, heating both portions to a softened state, bending said both portions along a rigid template form in the shape of an arc of a circle, and allowing both portions to cool to room temperature and thereby to become less soft and more rigid while in contact with the rigid template form in the shape of an arc of a circle.

* * * * *